May 15, 1928.   J. W. GREER   1,669,613
CONVEYER BELT
Filed Dec. 22, 1925   2 Sheets-Sheet 1
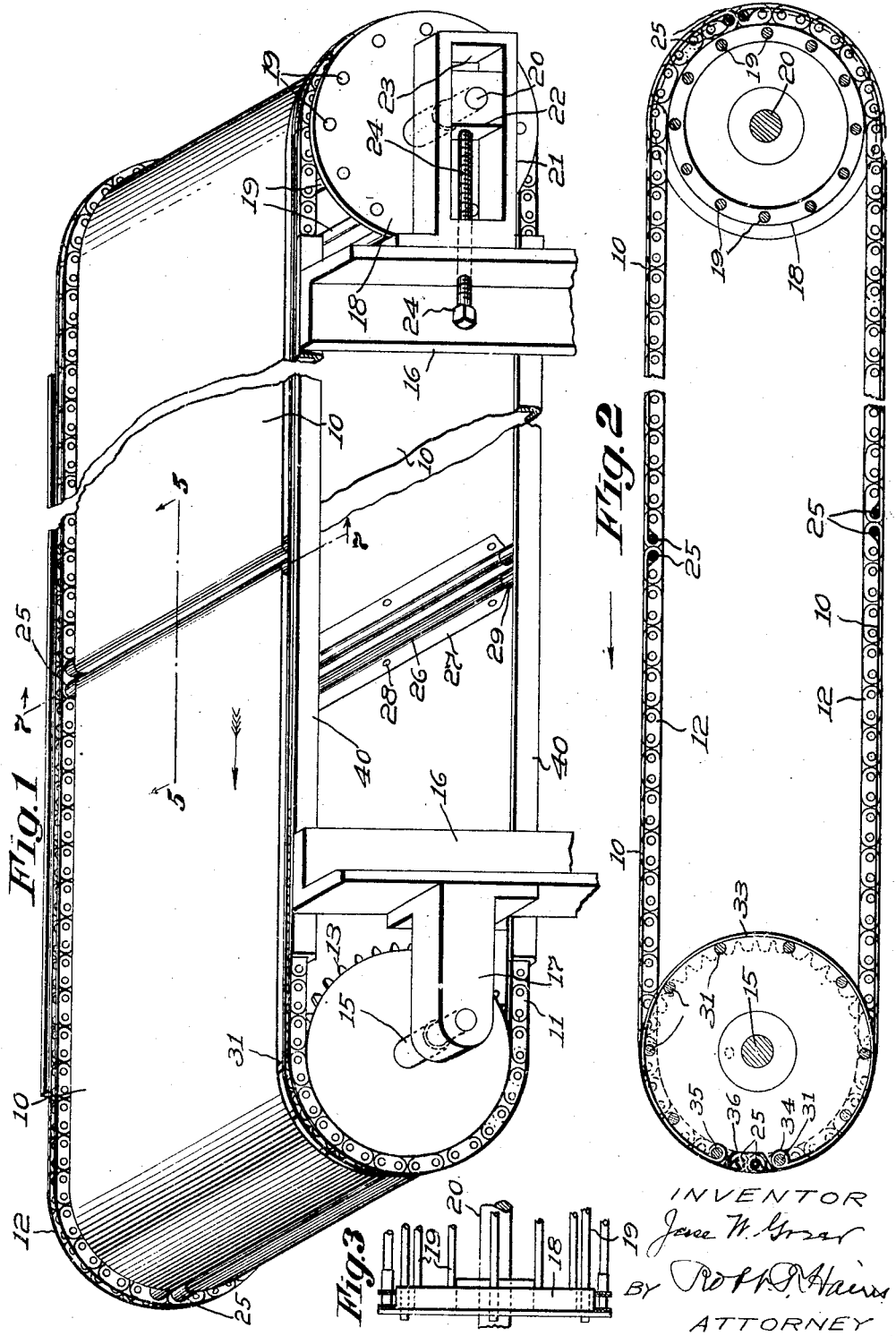
INVENTOR
Jesse W. Greer
BY Rob't R. Hains
ATTORNEY

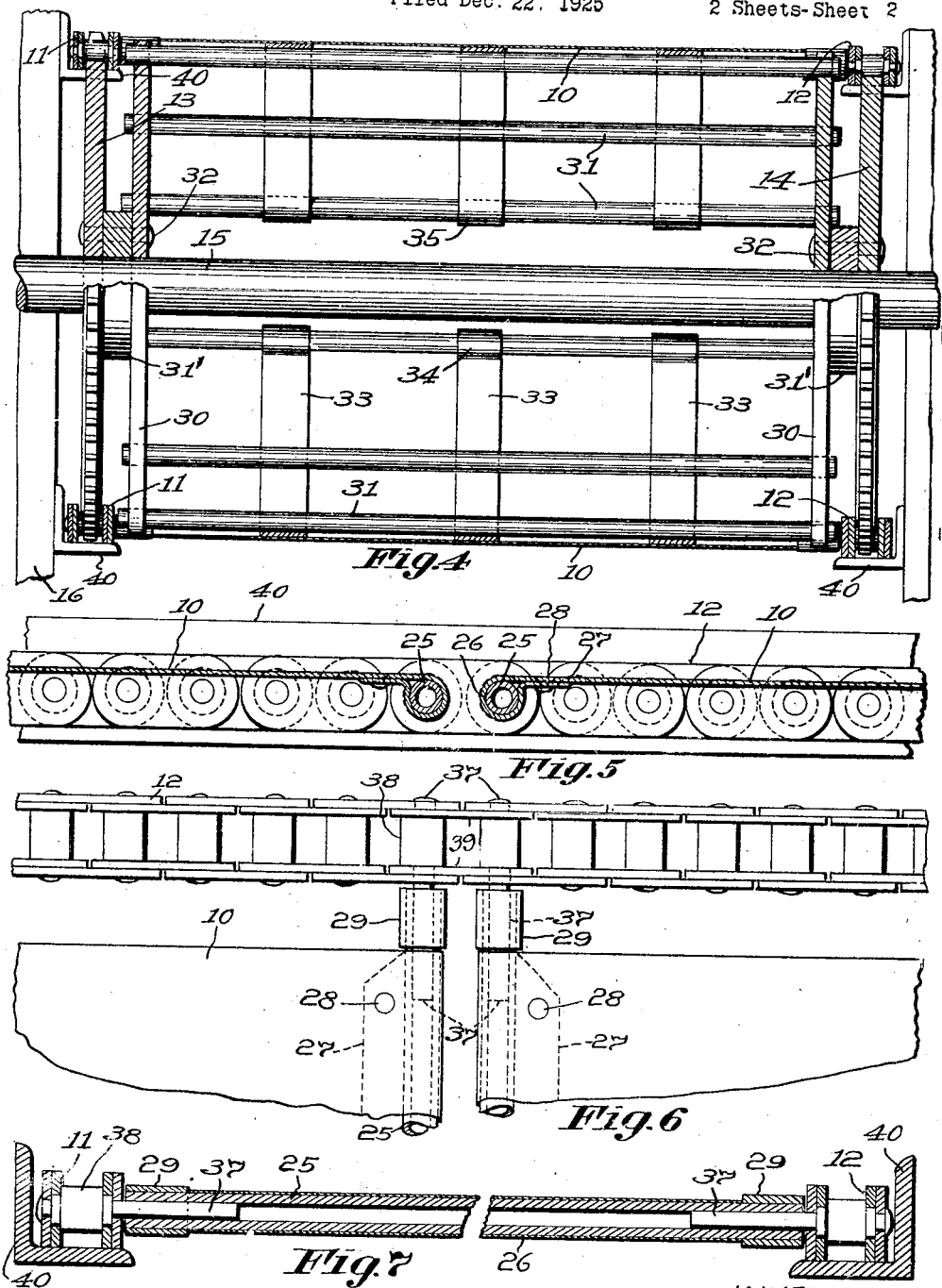

Patented May 15, 1928.

1,669,613

UNITED STATES PATENT OFFICE.

JESSE W. GREER, OF CAMBRIDGE, MASSACHUSETTS.

CONVEYER BELT.

Application filed December 22, 1925. Serial No. 77,108.

This invention relates to conveyer belts and more particularly to a sectional conveyer belt having the sections connected to side chains.

There is an urgent need in the confectionery industry for a strong, durable belt that is adapted to convey candy, biscuits and other confections thru a cooling chamber.

Cloth or composition belts have been employed heretofore for this purpose but they are not satisfactory because they are likely to run crooked, and also because they act as a heat insulator which prevents a rapid exchange of heat between the confections and chamber thru which they are passing. Continuous metal belts have also been proposed for this purpose but they likewise are open to the objection that they tend to run crooked; and trays advanced by side chains have been proposed heretofore but they are heavier to operate than a belt and have other disadvantages.

The present invention therefore relates to a conveyer belt which is so constructed that it cannot run crooked and which is strong and durable and is simple in construction.

One of the primary features of the present invention resides in the construction whereby the belt sections work extremely satisfactorily when formed of sheet steel or other flexible metal, or of woven wire, and this is important because a metal or wire belt when used to cool confections or anything else will respond to temperature changes more quickly and will carry off the heat more rapidly than a cloth or composite belt. Furthermore, when it is desired to employ a belt to conduct confections or other articles thru an oven, a metal belt is much more suitable than a cloth or composite belt because it will withstand a much higher temperature.

In carrying out the present invention the conveyer belt is formed of a number of separate and independent sections each of which has its ends connected to the side chains, and as a result of this construction the sections are retained in proper relation to each other as they advance with the side chains, while at the same time sufficient freedom of movement is permitted the parts as they pass from one run to the other to prevent them from being subjected to undue strains or bending forces, even when the sections are formed of sheet metal.

The various features of the invention and novel combination of parts will be best understood from the following description when read in connection with the accompanying drawing of one good, practical form of the invention, wherein,—

Fig. 1 is a perspective view of a conveyer belt and its supporting means constructed in accordance with the present invention;

Fig. 2 is a vertical sectional view taken longitudinally of Fig. 1;

Fig. 3 is a side view of a portion of the idler drum of Fig. 1;

Fig. 4 on an enlarged scale is a vertical sectional view thru the driving drum of Fig. 1;

Fig. 5 is an enlarged sectional view taken on the line 5—5 of Fig. 1;

Fig. 6 on an enlarged scale is a plan view of a portion of the conveyer belt; and Fig. 7 is an enlarged sectional view taken on the line 7—7 of Fig. 1.

In the embodiment of the invention illustrated in the drawings, the conveyer belt is made up of a number of conveyer belt sections 10 which are connected to the endless side chains 11 and 12. These side chains may constitute sprocket chains of any well known or desired construction and at one end of a run they pass around and are positively driven by the sprockets 13 and 14 which may be rigidly secured to the driving shaft 15 and this shaft is provided with a driving pulley or other driving means not shown.

The side chains 11 and 12 may be supported by a frame of any suitable construction having the uprights 16 and the power shaft 15 may be supported at one end of the frame by the bearing brackets 17. The chains 11 and 12 may be supported at the opposite end of their run by an idle drum having the disk or flange portions 18 at each end of the drum and about which the side chains 11 and 12 pass. It is obvious that if desired the usual sprockets may be employed in place of the chain supporting flanges 18, but since the chains are not driven by the disk 18, but are merely supported thereby, this construction works very satisfactorily. The idle drum at the right hand end of the conveyer as shown in Fig. 1 is conveniently constructed by providing bars 19 which extend between and are rigidly secured to the spaced disks 18 to provide what may be termed a squirrel cage drum, and this drum may be mounted upon and supported by the shaft 20, the ends of which may be carried by brackets 21 fastened to the uprights 16. It may be desirable to provide means for adjusting the idle drum towards and from the driving shaft 15 to vary the tension of the side chains 11 and 12, and to this end, in the construction shown, the shaft 20 is journaled in blocks 22 that are slidably mounted in elongated openings 23 formed in the supporting brackets 21, and the blocks 22 may be moved lengthwise of these slots by turning the adjusting bolts 24.

The conveyer belt sections 10 may be conveniently constructed of a relatively wide strip of sheet metal such as steel, which is sufficiently flexible to bend around the belt supporting drums at the opposite ends of the belt conveying device, or, if desired, may be constructed of any other strong, durable material possessing the required properties. Each end of the belt conveyer sections 10 is secured to a transversely extending bar 25 which as shown comprises a relatively stiff pipe or piece of tubing. In the construction shown each end of the strip or sheet 10 is secured to the bar 25 by folding the end portion about the bar, as best shown in Fig. 5, and as designated by 26, and the end portion 27 of the sheet is brought upwardly against the under face of the sheet 10 and is rigidly secured thereto by rivets 28. This forms a strong durable connection between the ends of the sheet 10 and the supporting bars 25 and causes the upper face of the sheet 10 to present a smooth, level face adjacent the bars 25, as will be apparent from Figs. 2 and 5. Means should be provided for preventing the tubular bars 25 from sliding in the direction of their length within the looped or tubular portion 26 of the sheets 10, and to this end, in the construction shown, the tubular bars 25 are provided with sleeves 29 which are sweated or otherwise rigidly secured to the opposite ends of the bars.

The width of the sheets 10 of the conveyer belt sections is preferably such that these sheets will lie between the spaced side chains 11 and 12 so that the edges of the sheets 10 are spaced sufficiently from the side chains to prevent them from coming in contact with these chains, and the distance between the edges of the sheets 10 and the side chains may be determined by the length of the sleeves 29, as will be apparent from Fig. 6.

The construction of the conveyer belt sections 10 is such that only the ends of these sections are connected to the side chains, so that a slight relative movement is permitted between the side chains and the conveyer sections 10 as they pass around the drums at the opposite ends of the conveyer device, and this relative movement serves to relieve the operating parts from the stress and strain to which they might be subjected if connections were provided at numerous points between the side chains and the sheet sections 10.

It is assumed that the conveyer belt is driven in the direction indicated by the arrow shown in Fig. 1, and since the left hand drum is the one that serves to drive the side chains and to advance the conveyer belt sections, it is desirable that the drum be so constructed that it will present a cylindrical surface to the underface of the conveyer sections 10 to support the same, while at the same time it is desirable that the drums at each end of the conveyer device have more or less of an open construction, resembling somewhat a squirrel cage to prevent clinging of candy or other materials to the surface of the drums. The driving drum at the left hand end of the conveying device shown in Fig. 1 is therefore preferably given the construction shown in Fig. 4, wherein this drum consists of the spaced disks 30 having the bars 31 extending between these disks and rigidly secured thereto. The disks 30 may be mounted upon the main driving shaft 15 between the sprockets 13 and 14 and may be held in spaced relation to the sprockets by the sleeves 31' mounted upon the shaft 15 and to which the disks are secured by the rivets 32.

If the sheet metal sections 10 are permitted to rest upon the spaced bars 31 in passing around this driving drum, the tension upon the conveyer sections might cause the bars to form ridges in these sections, or otherwise distort their surface; to prevent this, the driving drum may be provided with the spaced bands 33 which extend practically entirely around the driving drum, as best shown in Fig. 2, and one end of each of these bands 33 is looped about a bar of the drum as at 34, while the other end of each of these bands is looped about the adjacent bar as at 35. This construction is desirable because it presents an annular supporting surface to the under face of the sections 10 except at the point where the adjacent supporting bars 25 pass around the drum, and at this point a gap or space such as indicated by 36 is provided to receive the adjacent bars 25, as clearly shown in Fig. 2.

It is desirable that the ends of the supporting bars 25 be pivotally connected to the side chains 11 and 12 so that these bars may rotate relatively to the chains sufficiently to relieve any twisting tension to which they might be subjected as the conveyer sections pass around the supporting drums. In the construction shown the ends of the bars 25 are secured to the side chains by providing the side chains with the projecting pins or stub shafts 37. These pins may be elongated pins or rivets of the side chain, as will be apparent from Figs. 6 and 7, and the pins 37 may be inserted thru or formed integral with the spacing sleeves 38 of the sprocket chain, as will be apparent from Fig. 6. The projecting ends of these pins are adapted to extend into the ends of the hollow bar or pipe 25 and as a result of this construction a conveyer belt section may be easily attached to or removed from the side chains by merely pulling the side chains apart to withdraw the pins 37 from the ends of the hollow bar 25. It should be noted that the side chains form the sole connection between the various conveyer sections 10, and to this end a single inner link 39 of a side chain may be provided with the two projecting pins 37, as best shown in Fig. 6. As a result of this construction the adjacent ends of two conveyer belt sections are held sufficiently close to each other to prevent the biscuits, cakes, or other articles being conveyed by the belt from falling thru the crack between adjacent belt sections.

The conveyer belt of the present invention may be given any desired length by including in the belt the necessary number of sections 10, and if the belt is relatively long it will be desirable to support both the upper and lower run of the belt, and the means shown to this end consists of the angle bars 40 extending lengthwise of the conveyer device at each side thereof and which are supported by the uprights 16. One of these angle irons at each side of the frame is secured in position to support the upper run of the belt, and a second angle iron is mounted in position to support the lower run, as will be apparent from Fig. 1. These angle irons, as will be apparent from Fig. 7, are preferably constructed so that they will support the side chains 11 and 12, but will not engage the conveyer sections 10, and as a result of this construction no wearing effect is produced between the conveyer sections and the supporting bars 40. This forms an extremely simple means of supporting the upper and lower runs of the conveyer sections, and at the same time it prevents the side chains from spreading sufficiently to withdraw the pins 37 from the ends of the bars 25.

The idle drum provided at the right hand end of the conveyer device, as shown in Fig. 1, need not have a diameter sufficiently large to exert a substantial supporting force upon the belt sections 10 as they pass around this drum; the bars 19 of the drum are therefore spaced inwardly towards the shaft 20 sufficiently to clear the bars 25 of the conveyer sections, as will be apparent from Fig. 2. As a result of this construction, a slight slippage or creeping movement may occur between the idle drum and the conveyer belt, without any objectionable result. Owing to this construction, whereby a substantial clearance space is provided between the belt sections 10 and the drum formed by the bars 19, the bending strain exerted upon the sections 10 as they pass around this idle drum is reduced to a minimum.

From the foregoing description, when read in connection with the drawings, it will be seen that the conveyer belt of the present invention is extremely simple in construction, and that when made of sheet metal it is very strong and durable. It will also be apparent that all tendency of the belt to run crooked is avoided and that due to the pivotal connection between the ends of the conveyer sections and side chains, the connecting portions are relieved from any twisting stress that would tend to strain or break the connecting parts.

Altho the conveyer belt constructed in accordance with the present invention is well adapted for various purposes, it is particularly well adapted for use in the confectionery industry because if the belt is formed of sheet metal or wire it may be used to convey biscuits, cakes, candies or other confections thru a cooling chamber, or to convey the confections to be cooked thru an oven, since the entire conveyer belt may be subjected to a high temperature without injury. Furthermore, the bars 40 constitute an extremely simple means for supporting the upper and lower runs of the conveyer belt and they are not likely to be injured by the heat of an oven.

What is claimed is:—

1. A conveyer belt, comprising in combination, a pair of endless chains supported in spaced relation to each other, sprockets for driving the chains, a series of flexible belt sections, bars secured to the ends of these sections, means for pivotally securing the ends of the bars to the side chains to support and advance the sections, drums mounted between the spaced chains at the ends of a run thereof to support the belt sections as they pass from one run of the chains to the other, one of the drums being formed of spaced rods extending axially of the drum to form a skeleton drum construction which will prevent the material being conveyed from accumulating upon its belt engaging surface and spaced bands extending around this skeleton drum over said rods to form a smooth belt supporting surface and each band having its ends spaced to provide a bar receiving gap and having its ends secured to adjacent rods.

2. A conveyer belt, comprising in combination, a pair of endless chains supported in spaced relation to each other, sprockets for driving the chains, a series of flexible belt sections, bars secured to the ends of these sections, means for pivotally securing these bars to the side chains to advance the sections, drums mounted between the spaced chains at the ends of a run thereof to support the belt sections as they pass from one run of the chains to the other, one of the drums being formed of spaced rods extending axially of the drum to form a skeleton drum construction adapted to receive a section-supporting bar between the rods, and spaced bands extending around the drum over said rods to form a smooth belt engaging surface and having a gap between their ends adapted to receive said bar.

3. A conveyer belt, comprising in combination, a pair of endless chains supported in spaced relation to each other, means for driving the chains, a series of flexible belt sections having bar-receiving loops formed at their opposite ends, a bar secured in each loop, sleeves fitted upon and rigidly secured to the opposite ends of the bars to hold the bars against movement longitudinally within the loops, and means for securing the opposite ends of the bars to the chains to support and drive the belt sections.

4. A belt section for a conveyer belt, comprising a flexible metal sheet bent at its opposite ends to form loops or tubes adapted to receive supporting bars, a bar mounted in each of the loops so that its ends project from the sides of the metal sheet, and collars rigidly secured to the projecting ends of the bars to hold the bars from moving in the direction of their length within the loops, said bars being constructed to hold the belt sheet section in assembled relation with other sheet sections of a conveyer belt.

5. A conveyer belt, comprising in combination, a pair of endless chains supported in spaced relation to each other, driving sprockets located at one end of a run of the chains and about which the chains pass, a pair of chain supporting disks located at the opposite end of a run of the chains and about which the chains pass with permissive creeping movement between the disks and chains, flexible belt sections mounted between the spaced chains and having supporting bars secured to their opposite ends to extend between the spaced chains, means for pivotally securing said bars to the side chains, a drum mounted between said sprockets to rotate therewith and adapted to support the belt sections as they pass from one run to the other, and a second drum mounted between said disks and having a diameter that is sufficiently small to provide a substantial clearance space between its outer surface and the belt sections passing about the same to relieve the sections from tension as they are advanced around the drum by the side chains and also to clear the section supporting bars.

6. A conveyer belt, comprising in combination, a pair of endless chains supported in spaced relation to each other, means for driving said chains, belt sections mounted between the spaced chains and each comprising a flexible integral sheet having its end portions bent to form integral loops that lie in their entirety below the plane of the active face of the sheet to provide the section with a smooth upper face throughout its length, and means for securing the ends of said bars to the side chains to support and advance the belt sections.

In testimony whereof, I have signed my name to this specification.

JESSE W. GREER.